United States Patent
Ang et al.

(10) Patent No.: US 10,282,178 B2
(45) Date of Patent: May 7, 2019

(54) DYNAMIC DETERMINATION OF INSTRUMENTATION CODE BASED ON CLIENT EXPERIENCE

(71) Applicant: International Business Machines Corporation, Armonk, NY (US)

(72) Inventors: Woi Leong Ang, Gwelup (AU); Ashley N. Clementi, Karrinyup (AU); Gavin M. Corfield, Fremantle (AU); Luke R. McKenna, Willetton (AU); Liam J. Poli, Applecross (AU)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 15/007,526

(22) Filed: Jan. 27, 2016

(65) Prior Publication Data
US 2017/0212741 A1    Jul. 27, 2017

(51) Int. Cl.
| G06F 9/45 | (2006.01) |
| G06F 8/41 | (2018.01) |
| H04L 29/08 | (2006.01) |

(52) U.S. Cl.
CPC .............. *G06F 8/433* (2013.01); *H04L 67/22* (2013.01); *H04L 67/306* (2013.01)

(58) Field of Classification Search
CPC .................................................... G06F 8/433
USPC ........................................................ 717/158
See application file for complete search history.

(56) References Cited

U.S. PATENT DOCUMENTS

| 7,519,702 | B1 | 4/2009 | Allan | |
| 8,032,626 | B1 | 10/2011 | Russell et al. | |
| 8,065,410 | B1 | 11/2011 | Breen et al. | |
| 8,938,721 | B2 | 1/2015 | Letca et al. | |
| 9,344,340 | B2 * | 5/2016 | Dadheech | H04L 41/5067 |
| 2007/0271375 | A1 | 11/2007 | Hwang | |
| 2012/0137210 | A1 | 5/2012 | Dillon | |
| 2013/0007297 | A1 * | 1/2013 | Soroushian | H04L 65/4084 709/231 |
| 2013/0159498 | A1 * | 6/2013 | Funge | H04L 65/80 709/224 |
| 2015/0333986 | A1 * | 11/2015 | Pang | H04L 41/5067 370/252 |

FOREIGN PATENT DOCUMENTS

| WO | WO 2014166523 A1 * | 10/2014 | ......... H04L 41/5067 |

OTHER PUBLICATIONS

Emre Kiciman et al., "AjaxScope: A Platform for Remotely Monitoring the Client-Side Behavior of Web 2.0 Applications", Oct. 2007, pp. 17-30.*

(Continued)

*Primary Examiner* — Wei Y Zhen
*Assistant Examiner* — Lanny N Ung
(74) *Attorney, Agent, or Firm* — Edward J. Wixted, III

(57) ABSTRACT

A computer-implemented method includes identifying one or more instrumentation code segments and identifying one or more client experience indications. The one or more client experience indications are associated with a client computer. The computer-implemented method further includes determining a data gathering scenario based on the one or more client experience indications. A corresponding computer program product and computer system are also disclosed.

15 Claims, 5 Drawing Sheets

(56) References Cited

OTHER PUBLICATIONS

Cegan, Lukas, "Improving the performance of loading web pages in the environment with high latency connections", Department of Information Technology, Faculty of Electrical Engineering and Informatics, University of Pardubice, Pardubice, Czech Republic, Radioelektronika (Radioelektronika), 2015 25th International Conference, Date of Conference: Apr. 21-22, 2015, DOI: 10.1109/RADIOELEK.2015.7128988, 5 pages.

IBM®, "Using the IBM HTTP Server Response Time module", IBM Performance Management on Cloud, 3 pages, printed on Oct. 20, 2015.

Infosys®, "Presentation tier performance optimization", White Paper, 12 pages, External Document, © 2015 Infosys Limited, Bangalore, India.

\* cited by examiner

DYNAMIC DETERMINATION OF INSTRUMENTATION CODE BASED ON CLIENT EXPERIENCE

BACKGROUND

The present invention relates generally to the field of data collection over networks, and more particularly to determining instrumentation code segments for data collection purposes.

In some computer network environments, data collection from one or more computers is performed using instrumentation code segments. Developers and users of those computer network environments continue to face difficulties and costs associated with determination of inefficient instrumentation code segments used for data collection purposes.

SUMMARY

A computer-implemented method includes identifying one or more instrumentation code segments and identifying one or more client experience indications. The one or more client experience indications are associated with a client computer. The computer-implemented method further includes determining a data gathering scenario based on the one or more client experience indications. A corresponding computer program product and computer system are also disclosed.

DETAILED DESCRIPTION

Figure 1:
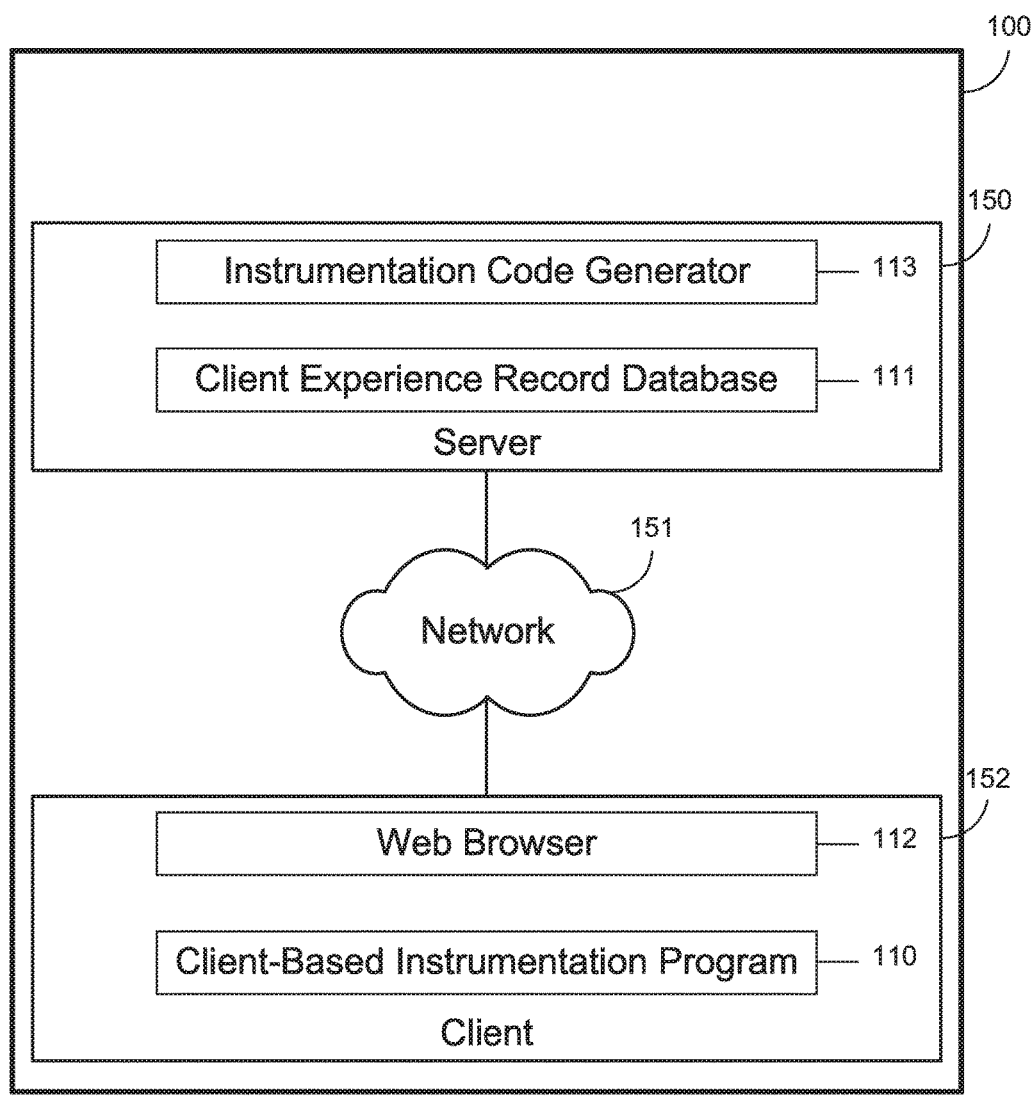
FIG. 1 is a block diagram of one embodiment of a computer system environment suitable for operation of a client-based instrumentation program, in accordance with at least one embodiment of the present invention.

FIG. 1 is a block diagram of a computer system environment 100 suitable for operating a client-based instrumentation program 110, in accordance with at least one embodiment of the present invention. In the computer system environment 100 depicted in FIG. 1, a client-based instrumentation program 110 and a web browser 112 collectively reside on a client computer 152. In at least some embodiments, a client experience indication is any indication of client computational power (e.g., execution and/or storage power) and/or client web browser computational power with respect to at least one piece of data in at least one time and under at least one set of one or more conditions. In at least some embodiments, a computer (hardware and/or software) component resides on a computer when the computer has local access to the computer component, and/or when the computer component is stored on the computer. In at least some embodiments, a web browser is any collection of one or more software applications that can, in whole or in part and directly or indirectly, during regular, non-exceptional operations retrieve, present, traverse, process and/or execute one or more information artefacts transmitted over at least one network (such as network 151). In at least some embodiments, the network comprises at least one of one or more copper transmission cables, optical transmission fibers, wireless transmission, routers, firewalls, switches, gateway computers and edge servers.

In the computer system environment 100 depicted in FIG. 1, the client computer 152 is connected through a network 151 (e.g., the combination of at least one of the Internet, a local area network, a wide area network or a wireless network) to a server computer 150. In the computer system environment 100 depicted in FIG. 1, an instrumentation code generator 113 and a client experience record database 111 collectively reside on the server computer 150. In at least some embodiments, an instrumentation code generator 113 is any combination of one or more computer (hardware and/or software) components that, in whole or in part and directly or indirectly, generates and/or determines at least one instrumentation code segment during regular, non-exceptional executions. In at least some embodiments, a client experience record database 111 is any (contiguous or non-contiguous) collection of one or more indications of one or more client experience indications, wherein the collection may reside in whole or in part on one or more computers. In at least some embodiments, the network comprises at least one of one or more copper transmission cables, optical transmission fibers, wireless transmission, routers, firewalls, switches, gateway computers and edge servers.

Figure 2:
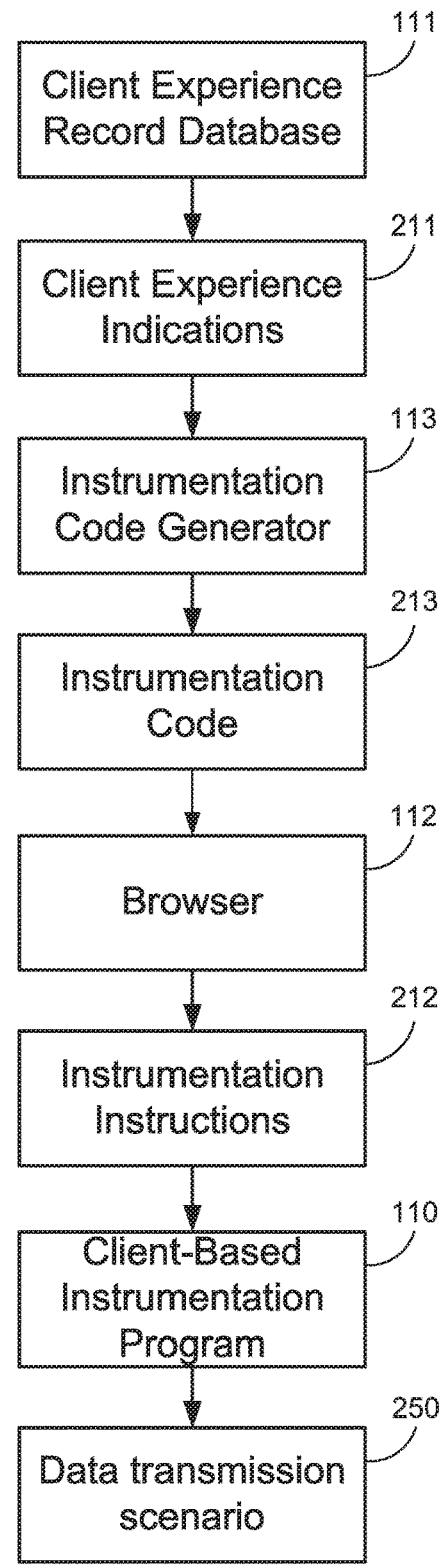
FIG. 2 is a data-flow diagram of a client-based instrumentation program, in accordance with at least one embodiment of the present invention.

FIG. 2 is a data flow diagram of a client-based instrumentation program, in accordance with at least one embodiment of the present invention. In the embodiment depicted in FIG. 2, the client experience record database 111 generates one or more client experience indications 211. The instrumentation code generator 113 uses the one or more client experience indications 211 (e.g., through determining and/or estimating one or more client experience values associated with a client computer executing the one or more instrumentation code segments 212) to generate one or more instrumentation code segments 213. In at least some embodiments, an instrumentation code segment 213 is any code segment that, during regular and non-exceptional executions, is capable of being caused to be executed and/or processed by a web browser.

In the embodiment depicted in FIG. 2, the web browser 112 processes the one or more instrumentation code segments 213 to determine one or more instrumentation instructions 212 contained in the one or more instrumentation code segments 213. In at least some embodiments, an instrumentation instruction 212 is any computer instruction that, in whole or in part and directly or indirectly, is conveyed, transmitted, and/or caused to be performed under regular, non-exceptional executions through one or more instrumentation code segments 213.

In the embodiment depicted in FIG. 2, the client based instrumentation program 110 uses the one or more instrumentation instructions 212 (e.g., through identifying one or more guidelines for data gathering required and/or recommended by the server computer) to e.g., determine a data gathering scenario 250. In at least some embodiments, a data gathering scenario 250 is any combination of one or more recommendations and/or requests for transmission of one or more data artefacts between at least two computers (such as at least one server computer and at least one client computer). In at least some embodiments, a client experience value indicates a client computer property, such as execution speed, rate of execution, risk of execution failure (e.g., based on one or more statistical information artefacts and/or one or more historical records associated with the computer), and the quality of data rendition (e.g., image, sound, and/or video rendition) by the client computer.

Figure 3:
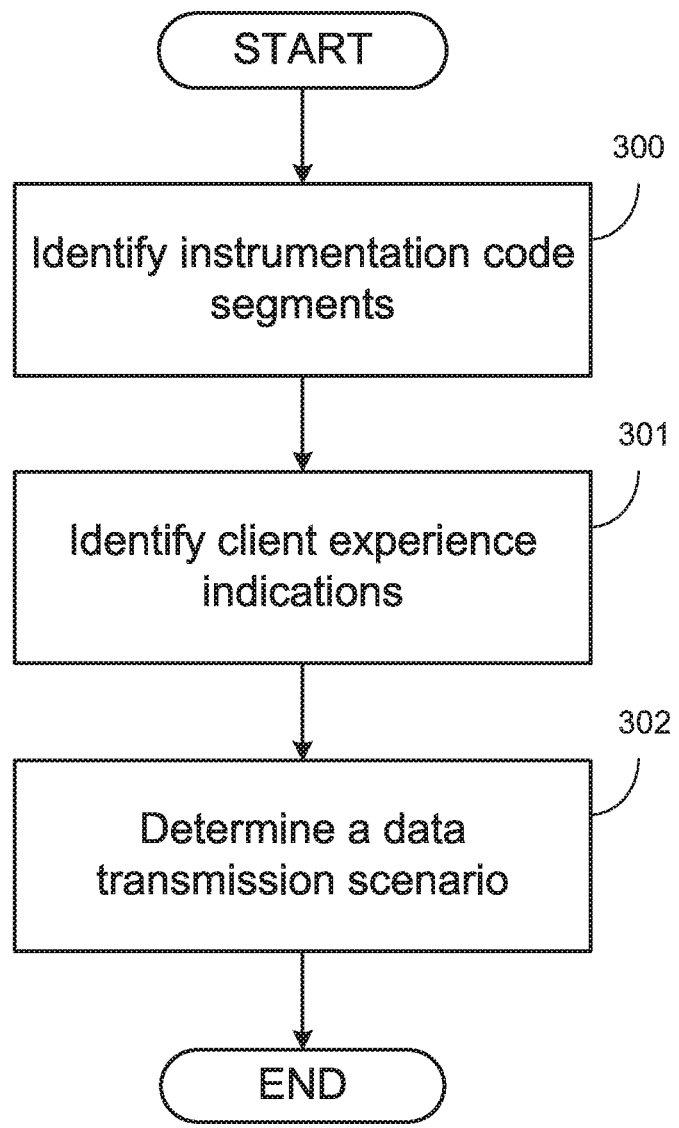
FIG. 3 is a flow-chart diagram of a client-based instrumentation program, in accordance with at least one embodiment of the present invention.

FIG. 3 is a flow-chart diagram of a client-based instrumentation program, in accordance with at least one embodiment of the present invention. At step 300, the program identifies one or more instrumentation code segments. At step 301, the program identifies one or more client experience indications associated with the client computer. At step 302, the program determines a data gathering scenario based on the one or more client experience indications.

In some embodiments, determining the data gathering scenario comprises determining whether the one or more client experience indications indicate that a client experience value (e.g., the rate of execution of one or more instrumentation code segments) on the client computer satisfies one or more quality criteria (e.g., the rate of execution of one or more instrumentation code segments exceeds a predefined threshold value of 2 instrumentation code segments per second). Responsive to the one or more client experience indications indicating that the client experience value on the client computer satisfies the one or more quality criteria, the client-based instrumentation program determines a regular data gathering scenario; and responsive to the one or more client experience indications indicating that the client experience value on the client computer does not satisfy the one or more quality criteria, the program determines an intensive data gathering scenario. In some embodiments, the one or more quality criteria may comprise at least one quality criterion concerning the rendition quality of the client web browser and/or the failure risk of the execution engine of the client web browser.

In some embodiments, determining whether a client experience value on the client computer satisfies the one or more quality criteria is based on a predefined threshold value. In an exemplary embodiment, the client-based instrumentation program determines that a client experience value denoting a rate of execution of one or more instrumentation code segments on the client computer satisfies the one or more quality criteria if the client experience value exceeds a predefined threshold value denoting a rate of execution of 3 instrumentation code segments per second; and the program determines that a client experience value denoting rate of execution of one or more instrumentation code segments on the client computer does not satisfy the one or more quality criteria if the client experience value does not exceed a predefined threshold value denoting a rate of execution of 3 instrumentation code segments per second. In yet another exemplary embodiment, the client-based instrumentation program determines that a client experience value denoting speed of execution of one or more instrumentation code segments on the client computer satisfies the one or more quality criteria if the client experience value is below a predefined threshold value denoting a speed of execution of 0.5 seconds per one instrumentation code; and the program determines that a client experience value denoting rate of execution of one or more instrumentation code segments on the client computer does not satisfy the one or more quality criteria if the client experience value is not below a predefined threshold value denoting a speed of execution of 0.5 seconds per instrumentation code. In some embodiments, one or more predefined threshold values are calculated at runtime (e.g., based on one or more user inputs). In some embodiments, one or more predefined threshold values are determined based on one or more properties and/or identifying indications associated with the client computer. In at least some of those embodiments, different client computers may have different predefined threshold values associated with them.

In some embodiments, a regular data gathering scenario is any combination of one or more recommendations and/or requests for transmission of one or more data artefacts between at least two computers at a rate below a predefined data gathering threshold value (e.g., a combination of one or more recommendations and/or requests for transmission of less than 10 data artefacts in each connection, a combination of one or more recommendations and/or requests for transmission that gathers less than all of data artefacts A, B, C, and D). In some embodiments, an intensive data gathering scenario is any combination of one or more recommendations and/or requests for transmission of one or more data artefacts between at least two computers at a rate equal to or above a predefined data gathering threshold value. In some embodiments, one or more predefined data gathering threshold values are calculated at runtime (e.g., based on one or more user inputs). In some embodiments, one or more predefined data gathering threshold values are determined based on one or more properties and/or identifying indications associated with the client computer. In at least some embodiments, an identifying indication associated with a computer is any indication that, wholly or partially and directly or indirectly, identifies one or more computers and/or one or more web browsers associated with one or more computers; and/or determines one or more properties associated with one or more computers and/or one or more web browsers associated with one or more computers. In at least some of those embodiments, different client computers may have different predefined data gathering threshold values associated with them.

In some embodiments, the client-based instrumentation program determines whether one or more client experience indications indicate that a client experience value (e.g., the rate of execution of one or more instrumentation code segments) on the client computer satisfies one or more exceptional performance criteria (e.g., the speed of execution of one or more instrumentation code segments exceeds a predefined critical threshold value of 2.5 seconds per instrumentation code). Responsive to the one or more client experience indications indicating that a client experience value (e.g., the rate of execution of one or more instrumentation code segments) on the client computer satisfies one or more exceptional performance criteria, the program determines an exceptional data gathering scenario. In some embodiments, an exceptional data gathering scenario is any combination of one or more recommendations and/or requests for transmission of one or more data artefacts between at least two computers at a rate below a predefined exceptional data gathering threshold (e.g., a combination of one or more recommendations and/or requests for transmission of all required data artefacts at one time).

In some embodiments, an exceptional data gathering scenario is any combination of one or more recommendations and/or requests for transmission of one or more data artefacts between at least two computers that will, during regular and non-exceptional operations, be executed if the one or more client experience indications indicate that a client experience value (e.g., the speed of execution of one or more instrumentation code segments) on the client computer indicates critical client experience (e.g. the speed of execution of one or more instrumentation code segments exceeds a predefined critical threshold value of 2 seconds per instrumentation code). In some embodiments, determining whether a client experience value on the client computer indicates critical client experience is based on a predefined critical threshold value. In some embodiments, one or more predefined data gathering threshold values are calculated at runtime (e.g., based on one or more user inputs). In some embodiments, one or more predefined critical threshold values are determined based on one or more properties and/or identifying indications associated with the client computer. In at least some of those embodiments, different client computers may have different predefined critical threshold values associated with them.

In some embodiments, an exceptional data gathering scenario is any combination of one or more recommendations and/or requests for transmission of one or more data artefacts between at least two computers that, during regular and non-exceptional operations, will be executed if the client computer determines, directly or indirectly, that it is experiencing (e.g., with a level of certainty exceeding a predefined certainty threshold, such as 90% certainty) one or more critical conditions. In some embodiments, the client computer determines that it is experiencing one or more critical conditions based on one or more critical condition determination guidelines (e.g., a guideline recommending a critical condition determination if the download speed falls below 1 Megabytes per second) and/or one or more inputs from one or more users, one or more computer (hardware or software) components, and/or one or more computers.

In some embodiments, the one or more instrumentation code segments comprise one or more experience-based instrumentation code segments selected from the group consisting of: (i) one or more regular data gathering instrumentation code segments; (ii) one or more intensive data gathering instrumentation code segments; and (iii) one or more exceptional data gathering instrumentation code segments. In some of those embodiments, identifying the one or more instrumentation code segments further comprises extracting the one or more experience-based instrumentation code segments from at least one web page. In general, in different embodiments of the present invention, the one or more instrumentation code segments may comprise one or more instrumentation code segments of one or more types, each type recommending and/or requiring a different combination of one or more data gathering guidelines and/or data gathering instructions.

In some embodiments, a regular data gathering instrumentation code segment is any instrumentation code segment that gathers information from the client computer and/or the web browser associated with the client computer at a rate below a predefined data gathering threshold value (e.g., an instrumentation code segment that gathers less than 10 data artefacts in each connection, or gathers less than all of data artefacts A, B, C, and D). In some embodiments, an intensive data gathering instrumentation code segment is any instrumentation code segment that gathers information from the client computer and/or the web browser associated with the client computer at a rate equal to or above a predefined data gathering threshold value. In some embodiments, one or more predefined data gathering threshold values are calculated at runtime (e.g., based on one or more user inputs). In some embodiments, one or more predefined data gathering threshold values are determined based on one or more properties and/or identifying indications associated with the client computer. In at least some of those embodiments, different client computers may have different predefined data gathering threshold values associated with them.

In some embodiments, an exceptional instrumentation code segment is any code segment that will, during regular and non-exceptional operations, be executed if the one or more client experience indications indicate that a client experience value (e.g., the speed of execution of one or more instrumentation code segments) on the client computer indicates critical client experience (e.g., the speed of execution of one or more instrumentation code segments exceeds a predefined critical threshold value of 2 seconds per instrumentation code). In some embodiments, determining whether a client experience value on the client computer indicates critical client experience is based on a predefined critical threshold value. In some embodiments, one or more predefined critical threshold values are calculated at runtime (e.g., based on one or more user inputs). In some embodiments, one or more predefined critical threshold values are determined based on one or more properties and/or identifying indications associated with the client computer. In at least some of those embodiments, different client computers may have different predefined critical threshold values associated with them.

In some embodiments, an exceptional instrumentation code segment is any code segment that, during regular and non-exceptional operations, will be executed if the client computer determines, directly or indirectly, that it is experiencing (e.g., with a level of certainty exceeding a predefined certainty threshold, such as 90%) one or more critical conditions. In some embodiments, the client computer determines that it is experiencing one or more critical conditions based on one or more critical condition determination guidelines (e.g., a guideline recommending a critical condition determination if the download speed falls below 1 Megabytes per second) and/or one or more inputs from one or more users, one or more computer (hardware or software) components, and/or one or more computers.

In some embodiments, the client-based instrumentation program communicates at least one of the one or more instrumentation code segments or the one or more exceptional instrumentation code segments to the client computer. In some embodiments, communicating at least one of the one or more instrumentation code segments or the one or more exceptional instrumentation code segments to the client computer comprises embedding at least one of the one or more instrumentation code segments or the one or more exceptional instrumentation code segments in one or more web pages, and sending one or more indications of the one or more web pages to the client computer.

Figure 4A:
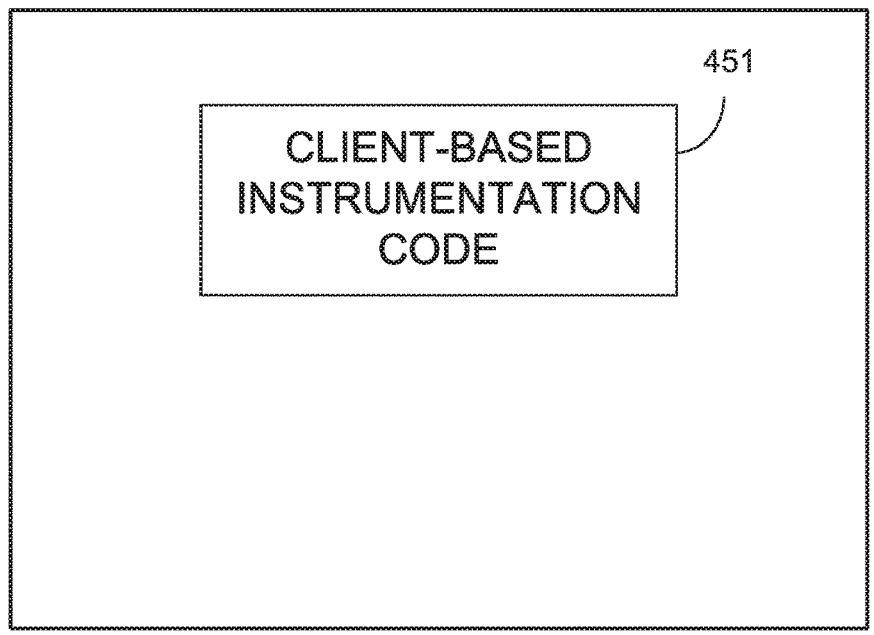
FIGS. 4A and 4B depict operational examples of instrumentation code segments extracted from web pages, in accordance with at least one embodiment of the present invention.
Figure 4B:
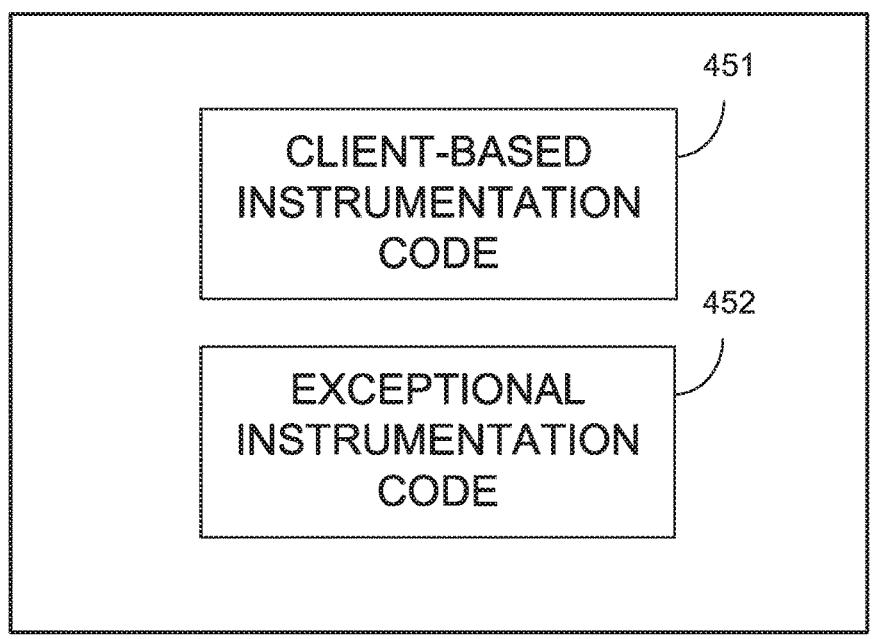

FIGS. 4A and 4B depict operational examples of instrumentation code segments extracted from two web pages, in accordance with at least one embodiment of the present invention. In the embodiment depicted in FIG. 4A, only one or more client-based instrumentation code segments 451 (such as one or more regular data gathering instrumentation code segments and/or one or more intensive data gathering instrumentation code segments, as introduced above) are extracted from a webpage. In the embodiment depicted in FIG. 4B, in addition to one or more client-based instrumentation code segments 451, one or more exceptional instrumentation code segments 452 are also extracted from a web page.

In general, one or more steps associated with different embodiments of the client-based instrumentation program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the client-based instrumentation program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

In some embodiments, determining whether to generate one or more instrumentation code segments based on the one or more client experience indications comprises determining one or more instrumentation code segments based on the one or more client experience indications. In some embodiments, the client-based instrumentation program determines one or more instrumentation code segments based on the one or more client experience indications. In some embodiments, one or more client experience indications and/or one or more client experience values are determined based on one or more web browser performance metric frameworks, such as W3C navigation timing metrics.

In some embodiments, the client-based instrumentation program collects one or more client experience information artefacts associated with the client computer and stores one or more indications of the one or more client experience information artefacts in a client experience record database. In some of those embodiments, the program constructs one or more client experience profiles associated with the client computer based on the one or more client experience information artefacts. In some embodiments, the program constructs one or more client experience profiles using one or more forecasting algorithms, such as one or more forecasting algorithms based on linear trending and/or neural networks.

Aspects of the present invention enable dynamically tuning one or more instrumentation code segments embedded in one or more webpages to the quality of client experience, as indicated by one or more client experience indications. In addition, in some embodiments, the present invention allows for tuning one or more instrumentation code segments embedded in one or more webpages to accommodate one or more critical conditions in the quality of client experience. As such, the present invention may increase the convenience, speed, and reliability of client experience when executing web pages with one or more instrumentation code segments embedded in them. Nevertheless, the aforementioned advantages are not required to be present in all of the embodiments of the invention and may not be present in all of the embodiments of the invention.

Figure 5:
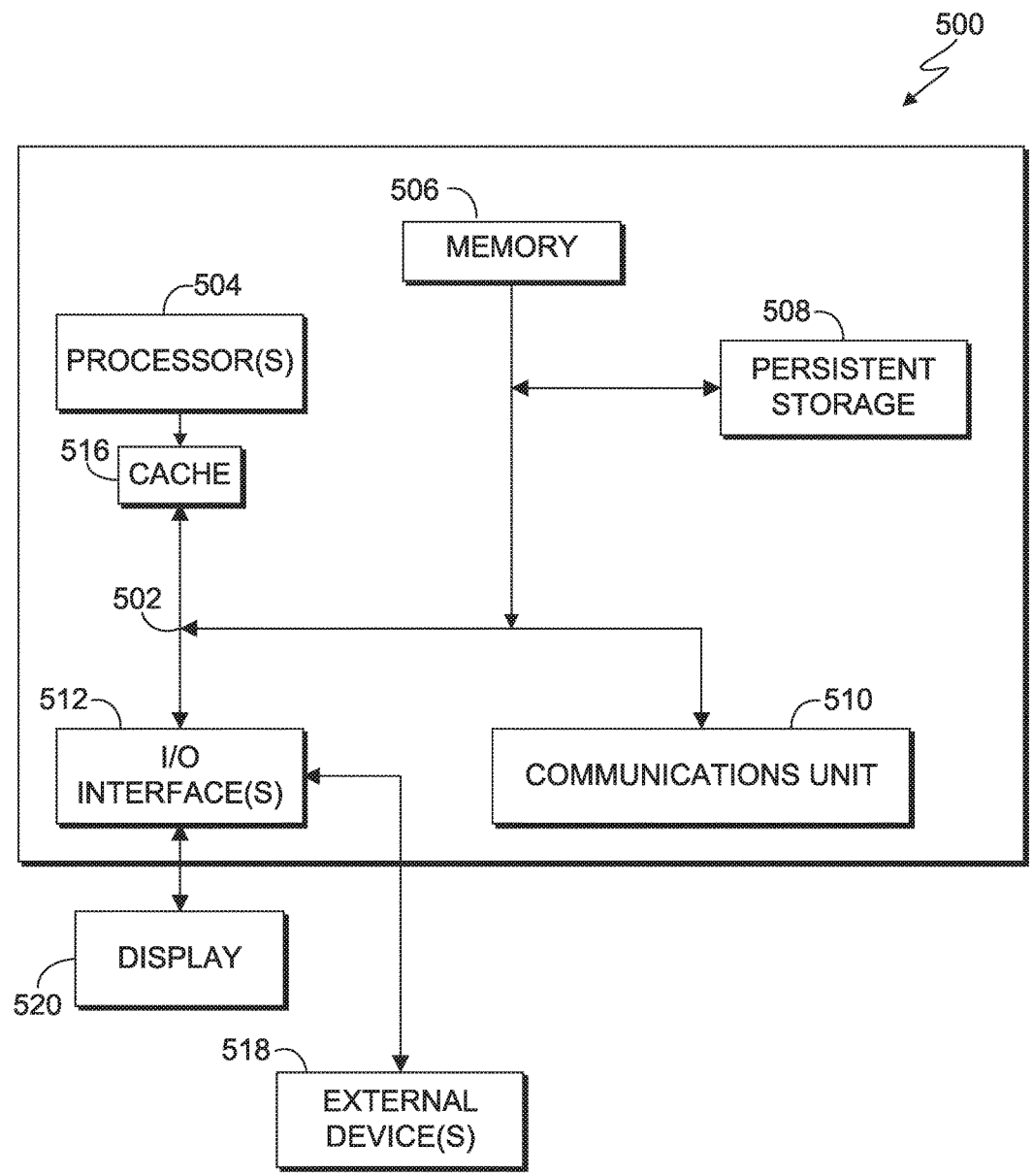
FIG. 5 is a block diagram of a computing apparatus suitable for executing a client-based instrumentation program, in accordance with at least one embodiment of the present invention.

FIG. 5 is a block diagram depicting components of a computer 500 suitable for executing the client-based instrumentation program. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the client-based instrumentation program may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The client-based instrumentation program may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying one or more instrumentation code segments embedded in a web page;
identifying one or more client experience indications based on an interaction with said web page, said one or more client experience indications being associated with a client computer;
determining that said one or more client experience indications indicate that a client experience value on said client computer does not satisfy: (i) one or more quality criteria and (ii) a risk of execution failure, wherein:
said one or more quality criteria concerns quality of rendition at a client web browser; and
said risk of execution failure is based on historical records associated with the client computer; and
responsive to said one or more client experience indications indicating that said client experience value on said client computer does not satisfy: (i) said one or more quality criteria and (ii) said risk of execution failure, increasing an amount of data gathered about said web page by activating at least an additional instrumentation code segment already embedded in the web page of said one or more instrumentation code segments.

2. The computer-implemented method of claim 1, wherein said one or more instrumentation code segments comprise one or more experience-based instrumentation code segments selected from the group consisting of:
one or more regular data gathering instrumentation code segments;
one or more intensive data gathering instrumentation code segments; and
one or more exceptional data gathering instrumentation code segments.

3. The computer-implemented method of claim 2, wherein identifying said one or more instrumentation code segments further comprises extracting said one or more experience-based instrumentation code segments from the web page.

4. The computer-implemented method of claim 1, further comprising:
collecting one or more client experience information artefacts, said one or more client experience information artefacts being associated with said client computer; and
storing one or more indications of said one or more client experience information artefacts in a client experience record database.

5. The computer-implemented method of claim 4, further comprising:
constructing one or more client experience profiles associated with said client computer based on said one or more client experience information artefacts.

6. The method of claim 1, wherein said one or more quality criteria further concerns execution speed and rate of execution.

7. A computer program product, comprising one or more computer readable storage media and program instructions stored on said one or more computer readable storage media, said program instructions comprising instructions to:
identify one or more instrumentation code segments embedded in a web page;
identify one or more client experience indications, based on an interaction with said web page said one or more client experience indications being associated with a client computer;
determine that said one or more client experience indications indicate that a client experience value on said client computer does not satisfy: (i) one or more quality criteria and (ii) a risk of execution failure, wherein:
said one or more quality criteria concerns quality of rendition at a client web browser; and
said risk of execution failure is based on historical records associated with the client computer; and
responsive to said one or more client experience indications indicating that said client experience value on said client computer does not satisfy (i) said one or more quality criteria and (ii) said risk of execution failure, increase an amount of data gathered about said web page by activating at least an additional instrumentation code segment already embedded in the web page of said one or more instrumentation code segments.

8. The computer program product of claim 7, wherein said one or more instrumentation code segments comprise one or more experience-based instrumentation code segments selected from the group consisting of:
one or more regular data gathering instrumentation code segments;
one or more intensive data gathering instrumentation code segments; and
one or more exceptional data gathering instrumentation code segments.

9. The computer program product of claim 8, wherein said instructions to identify said one or more instrumentation code segments further comprise instructions to extract said one or more experience-based instrumentation code segments from the web page.

10. The computer program product of claim 7, wherein said program instructions further comprise instructions to:
collect one or more client experience information artefacts, said one or more client experience information artefacts being associated with said client computer; and
store one or more indications of said one or more client experience information artefacts in a client experience record database.

11. The computer program product of claim 10, wherein said program instructions further comprise instructions to:
construct one or more client experience profiles associated with said client computer based on said one or more client experience information artefacts.

12. A computer system comprising:
a processor;
one or more computer readable storage media;
computer program instructions;
said computer program instructions being stored on said one or more computer readable storage media; and
said computer program instructions comprising instructions to:
identify one or more instrumentation code segments embedded in a web page;

identify one or more client experience indications, based on an interaction with said web page said one or more client experience indications being associated with a client computer;

determine that said one or more client experience indications indicate that a client experience value on said client computer does not satisfy: (i) one or more quality criteria and (ii) a risk of execution failure, wherein:
    said one or more quality criteria concerns quality of rendition at a client web browser; and
    said risk of execution failure is based on historical records associated with the client computer;

responsive to said one or more client experience indications indicating that said client experience value on said client computer does not satisfy: (i) said one or more quality criteria and (ii) said risk of execution failure, increase an amount of data gathered about said web page by activating at least an additional instrumentation code segment already embedded in the web page of said one or more instrumentation code segments.

13. The computer system of claim 12, wherein said one or more instrumentation code segments comprise one or more experience-based instrumentation code segments selected from the group consisting of:

one or more regular data gathering instrumentation code segments;

one or more intensive data gathering instrumentation code segments; and one or more exceptional data gathering instrumentation code segments.

14. The computer system of claim 13, wherein said instructions to identify said one or more instrumentation code segments further comprise instructions to extract said one or more experience-based instrumentation code segments from the web page.

15. The computer system of claim 12, wherein said computer program instructions further comprise instructions to:

collect one or more client experience information artefacts, said one or more client experience information artefacts being associated with said client computer; and store one or more indications of said one or more client experience information artefacts in a client experience record database.

* * * * *